Jan. 2, 1968 E. H. RUBLE 3,361,369
CHLORINATOR AND DISPOSAL UNIT FOR MARINE WATER CLOSET
Filed Sept. 8, 1964 2 Sheets-Sheet 1
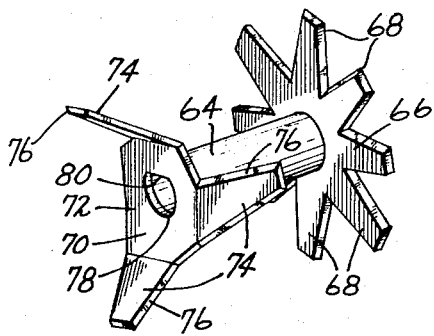
FIG. 5
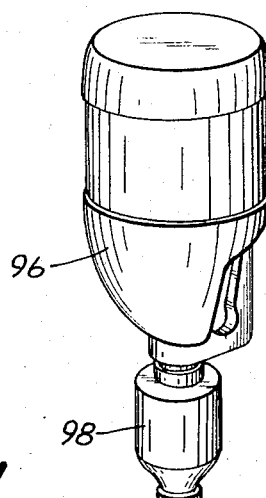
FIG. 1
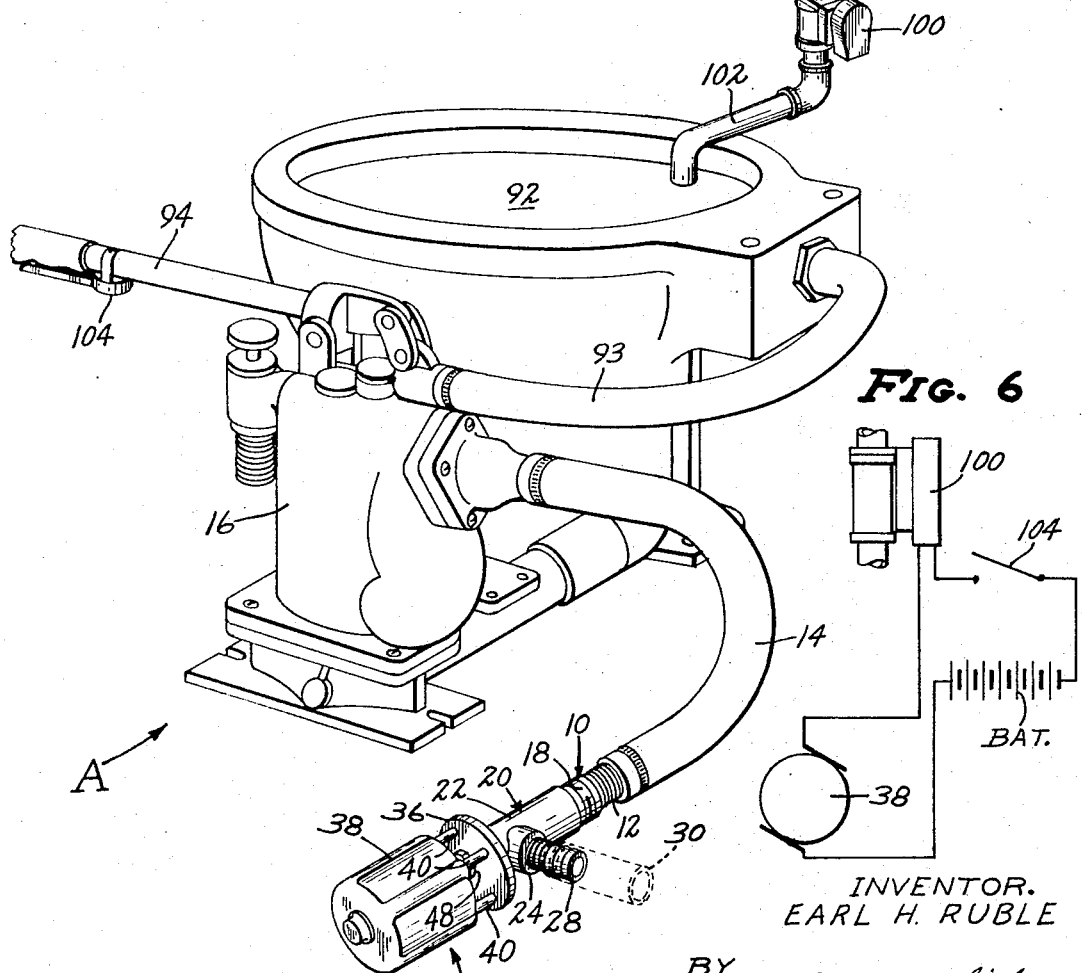
INVENTOR.
EARL H. RUBLE
BY
Caswell, Legaard & Hicks
ATTORNEYS INVENTOR.
EARL H. RUBLE
BY Caswell, Lagaard & Hicks
ATTORNEYS United States Patent Office 3,361,369
Patented Jan. 2, 1968

3,361,369
CHLORINATOR AND DISPOSAL UNIT FOR MARINE WATER CLOSET
Earl H. Ruble, Duluth, Minn., assignor to James A. Kilbane, Jr., Excelsior, Minn.
Filed Sept. 8, 1964, Ser. No. 394,924
4 Claims. (Cl. 241—46)

The invention relates broadly to an improvement in a device for the handling of sewage and more particularly to sewage which must be disposed of from the water closet of a boat in a chemically treated and broken up condition.

With the great increase in recent years of the number of boats requiring discharge of raw sewage into the water, the sewage must be treated to prevent the creation of a health problem in most boating areas.

It is an object of the invention to provide a device which chlorinates and positively breaks up the sewage into small particles which gives a greater and more positive chlorinating treatment of the sewage particles for disposal. The device is compact and because of its formation it is sturdy and withstands extended use and abuse. It is a further object to provide a macerating chamber having cutter blades and a flow director for orienting and directing the flow of waste through the chamber, the flow director acting in conjunction with a cutter blade to shear pieces of waste.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the chlorinating device in connection with a marine toilet.

FIGURE 5 is a perspection view of a macerating blade removed from the unit.

FIGURE 6 is a wiring diagram of the device.

Figure 2:
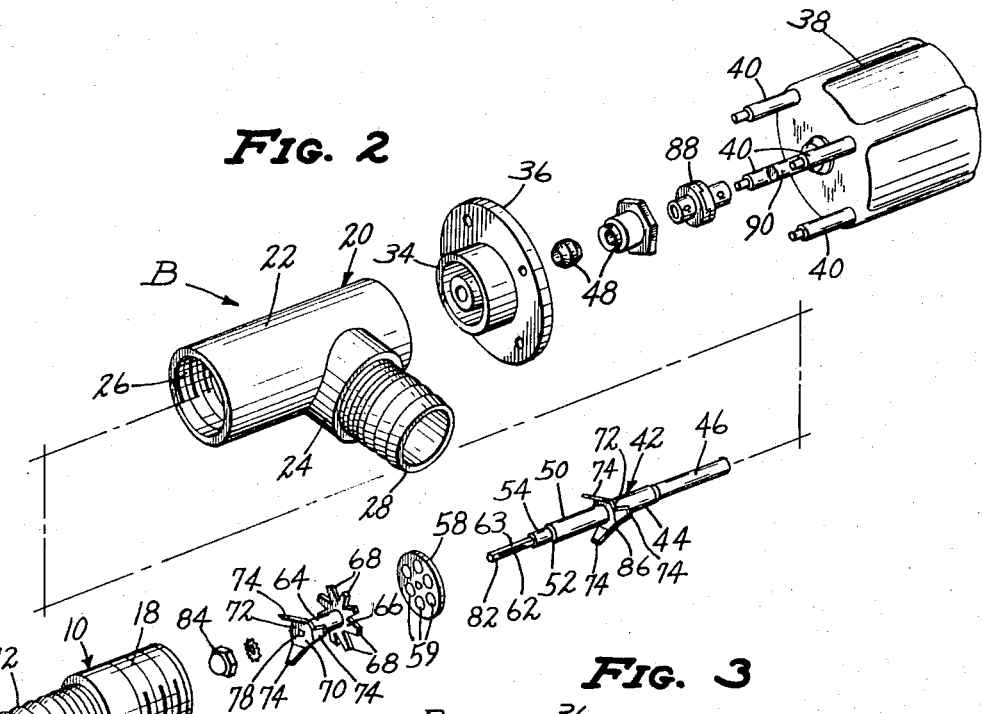
FIGURE 2 is an exploded perspective view of the chlorinator.
Figure 3:
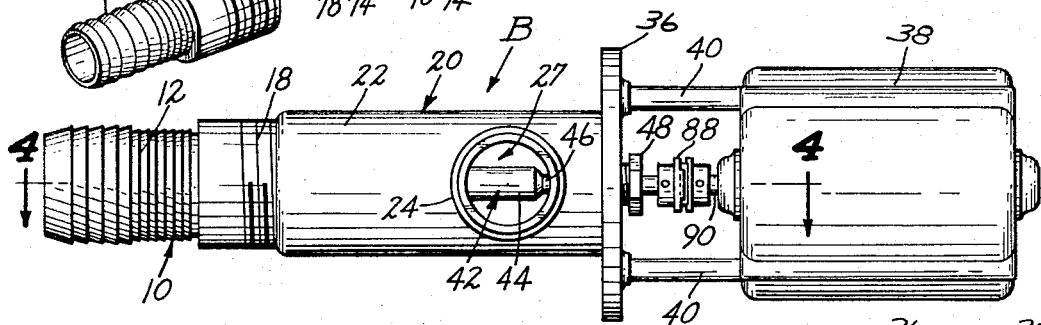
FIGURE 3 is a side elevational view of the macerating unit.
Figure 4:
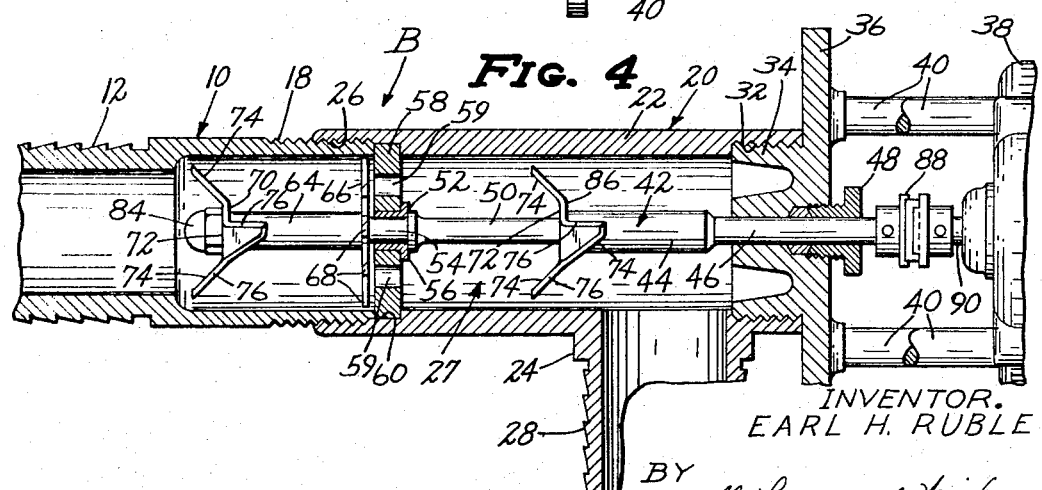
FIGURE 4 is a sectional view on the line 4—4 of FIGURE 3.

Referring to the drawings in detail, the device A includes the macerating unit B, and the unit B includes the hollow cylindrical adapter 10, the outer end of which is ribbed as at 12 for positive sealing engagement with the outer end of the hose 14, the inner end of which is connected to the conventional soil pump 16. The adapter 10 also includes the threaded inner end portion 18. Further provided is the hollow T member 20 formed of the longitudinal portion 22 and the right angle outlet lead portion 24. The inner outer end of the T 20 is threaded as at 26 and is threadedly engaged with the inner threaded end 18 of the adapter. The adapter 10 and the portion 22 of the T 20 form a macerating chamber 27.

The lead or right angle portion 24 of the T 20 is ribbed as at 28 for positive sealing engagement with the inner end of the outlet hose 30 which leads outwardly of the hull of a boat in which the device A is installed. The inner end of the longitudinal portion 22 of the T 20 is threaded as at 32 for threaded engagement with the threaded hollow end portion 34 of the plate 36 mounted on the motor 38 by means of the supports 40.

Mounted axially within the portion 22 of the T 20, the adapter 10 and the end portion 34 is the macerator shaft 42. The shaft 42 includes the enlarged substantially central portion 44 which terminates in the inner reduced portion 46 mounted in the packing gland 48 mounted axially in the plate 36. The central portion 44 of shaft 42 also terminates in the outer reduced portion 50 with the shoulder 52 thereon. The shoulder 52 terminates in the short shaft portion 54 which rides in the friction bearing member 56 mounted axially in the flat circular flow director member 58 press fit in the annular channel 60 formed on the inner surface of the longitudinal portion 22 of T member 20. The flow director 58 is formed with the spaced holes 59. The short shaft portion 54 terminates in the reduced end portion 62 formed with the flattened portion 63.

The numeral 64 designates a tubular mount which fits upon the threaded end portion 62, and secured to the inner end of the tubular amount 64 is the flat circular cutter blade 66 formed with the radially extending spaced blades 68. Secured to the outer end of the mount 64 is a first macerator blade 70. The macerator blade 70 includes the flat central portion 72 and extending radially from the flat central portion 72 are the blades 74 which are in the form of a trapezium tapering from the center to the outside with a cutting edge formed on the side 76. The blades 74 are angularly disposed relative to the flat central portion 72. The flat central portion 72 of blade 70 is formed with the axial hole 78 having the straight portion 80 which aligns upon the flattened portion 63 of reduced end portion 62 to prevent rotation of the blade 70. The reduced end portion 62 extends through the tubular mount 64, and the extreme outer end of the end portion 62 is threaded as at 82 which receives the nut 84 which secures the mount 64. There is a vortex created by the blade 70 and this is taken care of by the flow director 58 having the holes 59.

Secured to the reduced portion 50 is the second macerator blade 86, said blade being identical in formation to the first macerator blade 70. The extreme inner end of the shaft inner reduced portion 46 is secured to the coupling 88 connected to the motor shaft 90.

The first macerator blade 70 chops and emulsifies the waste and directs the waste to the cutter blade 66. The blade portions 68 of blade 66 shear pieces of waste going through the holes 59 of flow director 58 due to the proximity of the flow director to the cutter blades. The flow director has a dual purpose, for it shears pieces of waste as above and the size of the holes 59 thereof controls the size of waste pieces passing through the flow director. With the waste reduced to small pieces the surface thereof is increased thereby contributing to greater chlorination of the particles. At the second macerator blade 86 further maceration of the waste is accomplished and the particles are still further cut up and reduced in size which aids still further in chlorination of the waste.

Fresh water is pumped to the bowl 92 via the line 93 by operating the handle 94 of the conventional pump 16. Also, with operation of the handle 94 waste is simultaneously pumped from the bottom of the bowl 92 via hose line 14 to the unit B for macerating as above described and discharged out the outlet hose 30.

Further provided is the container 96 which is for the hypochloride used. The container 96 is mounted on a cap on the dosing or metering bottle 98 which in turn is mounted on a solenoid valve 100 from which extends the dispensing tube 102. The dosing bottle 98 holds 500 ml. and forms a dosing reservoir which will permit an initial dose of 420 ml. of hypochlorite and a continual supply of 3 ml. of hypochlorite per second when the solenoid valve 100 is opened. Tests have shown that the 3 ml. amount per second is ample to provide the necessary coliform (m.p.n.) reduction as required by Water Pollution Control Commission Criteria.

The solenoid valve 100 is located just after the dosing bottle 98 and is normally closed. The valve 100 is wired in parallel with the motor 38 and is actuated automatically by the switch 104 mounted on the pump handle simultaneously with the macerator motor. Thus, as the handle 94 is pumped and the switch 104 thereon actuated, water is pumped to the bowl 92, the valve dispenses hypochlorite out of the tube 102 and the waste with the hypochlorite is pumped to the unit B, the motor of which is also actuated whereby the chlorinated and macerated waste is expelled. It will thus be seen that each time the handle is pumped the chlorinating and macerating automatically takes place.

It will not be here attempted to set forth and indicate all of the various objects and advantages incident to the invention, but other objects and advantages will be referred to in or else will become apparent from that which follows.

I claim:

1. A device for treating and disposing of refuse in combination with a marine water closet having a soil pump having a water-suction portion for supplying flushing water to said water closet, and a refuse portion for pumping waste material from said water closet comprising:
   (a) means for supplying a chlorinating liquid to the bowl of said toilet,
   (b) an outlet hose connected at one end to the refuse portion of said soil pump,
   (c) a hollow cylindrical macerating chamber having an inlet,
   (d) an outlet leading from said chamber,
   (e) the other end of said outlet hose connected to one end of said macerating chamber,
   (f) a shaft mounted axially in said macerating chamber,
   (g) means for rotating said shaft,
   (h) a first macerating circular cutter having a multiplicity of spaced cutting blades and mounted on the outer end of said shaft,
   (i) said macerating cutting blades being angularly disposed relative to the transverse axis of said shaft,
   (j) a flat circular multiple blade cutter mounted on said shaft and spaced from said macerating blade unit,
   (k) a flat circular flow director member secured axially within said macerating chamber,
   (l) said flow director having a multiplicity of holes extending therethrough,
   (m) said multiple blade cutter positioned adjacent said flow director to shear pieces of waste extending from said holes of said flow director, and
   (n) a second macerating circular cutter blade unit mounted on said shaft spaced from said flow director and adjacent said outlet.

2. A device for treating and disposing of refuse in combination with a marine water closet having a soil pump having a water suction portion for supplying flushing water to said water closet, and a refuse portion for pumping water material from said water closet comprising:
   (a) means for supplying a chlorinating liquid to the bowl of said water closet,
   (b) an outlet hose connected at one end to the refuse portion of said soil pump,
   (c) a hollow macerating chamber,
   (d) an outlet leading from said chamber,
   (e) the other end of said outlet hose connected to one end of said macerating chamber,
   (f) a shaft mounted axially in said macerating chamber,
   (g) means for rotating said shaft,
   (h) a first macerating cutter blade mounted on the outer end of said shaft,
   (i) a flat circular multiple blade cutter mounted on said shaft and spaced from said macerating cutter blade,
   (j) a flat circular flow director member secured axially within said macerating chamber,
   (k) said flow director having a plurality of holes extending therethrough for orienting and directing the flow of waste through said chamber,
   (l) said circular multiple blade cutter positioned adjacent said flow director to shear pieces of waste extending from said holes of said flow director,
   (m) a second macerating cutter blade mounted on said shaft intermediate said flow director and said outlet.

3. A device for treating and disposing of refuse in combination with a marine water closet having a soil pump having a water suction portion for supplying flushing water to said water closet, and a refuse portion for pumping water material from said water closet comprising:
   (a) means for supplying a chlorinating liquid to the bowl of said water closet,
   (b) an outlet hose connected at one end to the refuse portion of said soil pump,
   (c) a hollow macerating chamber,
   (d) an outlet leading from said chamber,
   (e) the other end of said outlet hose connected to one end of said macerating chamber,
   (f) a shaft mounted axially in said macerating chamber,
   (g) means for rotating said shaft,
   (h) a macerating cutter blade mounted on the outer end of said shaft,
   (i) a flat circular multiple blade cutter mounted on said shaft and spaced from said macerating cutter blade,
   (j) a flat circular flow director member secured axially within said macerating chamber,
   (k) said flow director having a plurality of holes extending therethrough for orienting and directing the flow of waste through said chamber,
   (l) said circular multiple blade cutter positioned adjacent said flow director to shear pieces of waste extending from said holes of said flow director.

4. A device for treating and disposing of refuse in combination with a marine water closet having a soil pump having a water suction portion for supplying flushing water to said water closet, and a refuse portion for pumping waste material from said water closet comprising:
   (a) means for supplying a chlorinating liquid to the bowl of said water closet,
   (b) an outlet hose connected at one end to the refuse portion of said soil pump,
   (c) a hollow macerating chamber,
   (d) an outlet leading from said chamber,
   (e) the other end of said outlet hose connected to one end of said macerating chamber,
   (f) a shaft mounted axially in said macerating chamber,
   (g) means for rotating said shaft,
   (h) a macerating cutter blade mounted on the outer end of said shaft,
   (i) a cutter blade mounted on said shaft,
   (j) a flat circular flow director member secured axially within said macerating chamber,
   (k) said flow director having a plurality of holes extending therethrough for orienting and directing the flow of waste through said chamber,
   (l) said cutter blade positioned adjacent said flow director to shear pieces of waste extending from said holes of said flow director.

(References on following page)

References Cited

UNITED STATES PATENTS

| | | | |
|---|---|---|---|
| 2,087,492 | 7/1937 | Williams | 241—41 |
| 2,200,061 | 5/1940 | Green | 146—181 |
| 2,414,964 | 1/1947 | McPherson | 241—46 XR |
| 2,435,845 | 2/1948 | Rice | 4—10 |
| 2,594,250 | 4/1952 | Tranbarger | 241—152 XR |
| 2,639,747 | 5/1953 | Burn | 241—46 XR |
| 2,672,075 | 3/1954 | Fraser | 241—43 |
| 2,678,450 | 5/1954 | Simpson | 4—10 |
| 3,053,297 | 9/1962 | Brundler | 146—192 |

GERALD A. DOST, *Primary Examiner.*

SAMUEL FEINBERG, *Examiner.*

H. F. PEPPER, *Assistant Examiner.*